(12) United States Patent
Merino Lopez

(10) Patent No.: US 11,027,508 B2
(45) Date of Patent: Jun. 8, 2021

(54) METHOD FOR RETREADING A TIRE CASING USING A ROLLER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Jose Merino Lopez, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 695 days.

(21) Appl. No.: 15/105,769

(22) PCT Filed: Dec. 18, 2014

(86) PCT No.: PCT/FR2014/053414
§ 371 (c)(1),
(2) Date: Jun. 17, 2016

(87) PCT Pub. No.: WO2015/097374
PCT Pub. Date: Jul. 2, 2015

(65) Prior Publication Data
US 2017/0028660 A1 Feb. 2, 2017

(30) Foreign Application Priority Data

Dec. 23, 2013 (FR) ....................... 1363443

(51) Int. Cl.
*B29D 30/56* (2006.01)
*B29D 30/54* (2006.01)
*B29D 30/52* (2006.01)

(52) U.S. Cl.
CPC ............. *B29D 30/54* (2013.01); *B29D 30/56* (2013.01); *B29D 2030/523* (2013.01); *B29D 2030/544* (2013.01)

(58) Field of Classification Search
CPC .... B29D 30/0005; B29D 30/14; B29D 30/54; B29D 30/56; B29D 2030/523; B29D 2030/544; B29D 2030/585
See application file for complete search history.

(56) References Cited

U.S. PATENT DOCUMENTS 3,558,383 A * 1/1971 Lejeune ................. B29D 30/54
156/96
3,753,821 A 8/1973 Ragen
(Continued)

FOREIGN PATENT DOCUMENTS

EP 1 150 831 3/2004
FR 2953456 A1 6/2011
(Continued)

*Primary Examiner* — Geoffrey L Knable
(74) *Attorney, Agent, or Firm* — Dickinson Wright PLLC; Steven Hurles

(57) ABSTRACT

A method of retreading a tire casing includes the step of disposing a cured rubber tread on a carcass with a layer of hot-melt material interposed between the tread and the carcass. The method continues with the step of rollering the tread by means of at least one roller with a width (r) that is less than a width (b) of the tread.

10 Claims, 3 Drawing Sheets

(56) References Cited

U.S. PATENT DOCUMENTS

| | | | |
|---|---|---|---|
| 3,809,592 A | | 5/1974 | Dennis et al. |
| 3,894,897 A | | 7/1975 | Batchelor et al. |
| 3,904,459 A | * | 9/1975 | Schelkmann ........ B29D 30/542 |
| | | | 156/96 |
| 3,922,415 A | | 11/1975 | Dexter |
| 3,933,551 A | | 1/1976 | Brodie et al. |
| 3,976,532 A | * | 8/1976 | Barefoot ................ B29D 30/56 |
| | | | 156/406.2 |
| 3,989,563 A | | 11/1976 | Schelkmann |
| 4,088,521 A | | 5/1978 | Neal |
| 4,123,306 A | | 10/1978 | Landry |
| 4,137,112 A | * | 1/1979 | Hedlund ................ B29D 30/56 |
| | | | 152/532 |
| 6,630,044 B1 | | 10/2003 | Boling et al. |
| 2011/0056603 A1 | * | 3/2011 | Koutoku ................ B29D 30/52 |
| | | | 152/450 |
| 2015/0034230 A1 | * | 2/2015 | Abad .................... B29D 30/54 |
| | | | 156/96 |

FOREIGN PATENT DOCUMENTS

| | | | |
|---|---|---|---|
| FR | 2988644 A1 | | 10/2013 |
| JP | 2009-166650 A | * | 7/2009 |
| JP | 2011-042229 A | * | 3/2011 |
| JP | 2011-42229 A | | 3/2011 |
| JP | 2012192684 A | | 10/2012 |

\* cited by examiner

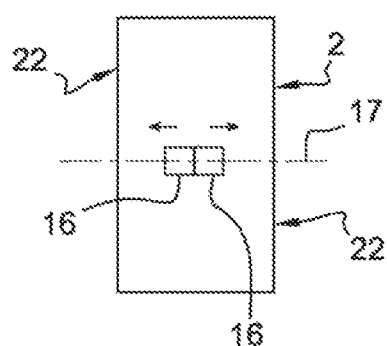
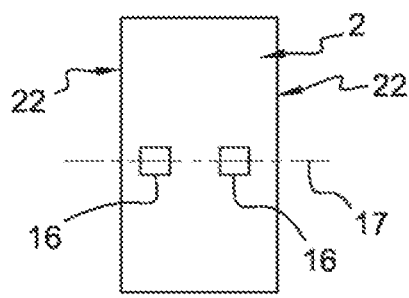
Fig. 2         Fig. 3
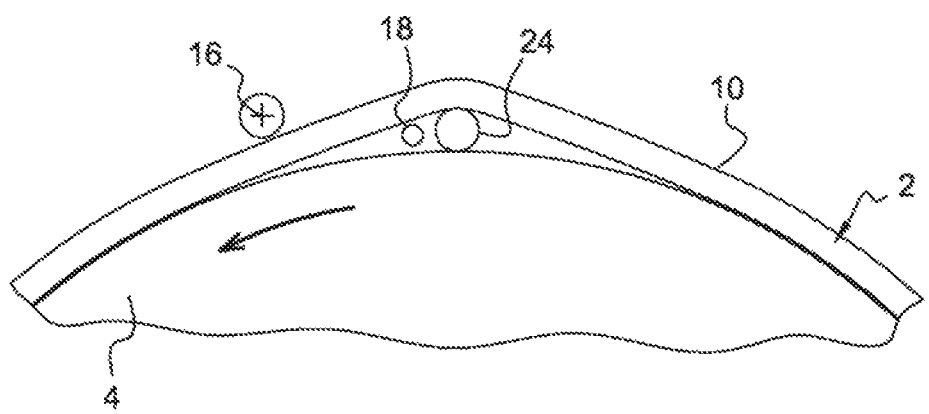
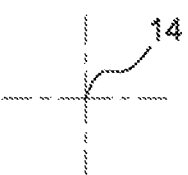
Fig. 4

METHOD FOR RETREADING A TIRE CASING USING A ROLLER

BACKGROUND

1. Field of the Invention

The present invention relates to the retreading of tires.

2. Related Art

The retreading of a tire casing consists in removing the worn tread from the casing in order to replace it with a tread in good condition, generally new.

To this end, it is known practice to provide, between the carcass and the tread, a hot-melt bonding layer that ensures the adhesion of the tread to the carcass and which softens when it is heated to a predetermined temperature, thereby making it possible to easily separate the tread from the carcass. Similarly, during the fitting of the new tread, the hot-melt layer is heated while applying pressure to the tread, then the casing is allowed to cool in order to obtain the adhesion of the tread to the carcass.

In order to apply pressure to the bonding layer, it is known practice to roller the tread by means of a roller which matches the profile of the tread across its entire width.

However, the shape of the roller depends on the shape of the tread and the tread patterns that it has. It is therefore necessary to have a roller for each type of tire casing. In addition, this method compresses the tread and can result in elongation thereof.

An aim of the disclosure is to remedy at least some of these drawbacks.

SUMMARY

To this end, according to the disclosure, a method for retreading a tire casing is provided, wherein, a cured rubber tread being disposed on a carcass with a layer of hot-melt material interposed between the tread and the carcass, the tread is rollered by means of at least one roller having a width less than a width of the tread.

Thus, the same roller can be used for tire casings of different types, in particular having different tread widths and different tread patterns. The entirety of the tread can be rollered by carrying out several circuits thereof with the roller.

Provision can be made for the tread to comprise reinforcers.

These reinforcers can comprise cords and/or threads. They can be metal or made of synthetic material, for example nylon, PET (polyethylene terephthalate), PEN (polyethylene naphthalate), rayon or aramid. They can be reinforcers oriented at angles of between +5° and −10° with respect to the longitudinal direction.

In one embodiment, the tread is provided in the form of a closed ring and it is disposed on the carcass.

The method according to the disclosure is in fact compatible with this type of tread.

Advantageously, hot-melt material is disposed on the tread and the carcass and then the tread is fitted on the carcass.

Preferably, the hot-melt material is heated before the rollering operation. Advantageously, the width of the roller is less than half the width of the tread.

Preferably, it is less than one quarter of the width of the tread.

Advantageously, the roller executes several circuits of the casing on the tread and the roller is moved in a direction of a casing axis between the circuits.

Provision can be made for the roller to exert a pressure of between 1 and $4 \times 10^5$ Pa on the hot-melt layer.

In one embodiment, the number of rollers is greater than or equal to two, the rollers rollering the tread simultaneously.

Thus, although rollers of small size are used, this embodiment makes it possible to avoid a large increase in cycle times.

Advantageously, the rollers are moved towards the respective opposite edges of the tread simultaneously.

In one embodiment, a space is created between an edge of the tread and the carcass, and the hot-melt material contiguous with this space is heated.

For example, during this step, another edge of the tread is in contact with the carcass.

This space can be created by means of a frustoconical tool for example.

This embodiment makes it possible to heat the bonding layer locally and at points just before the rollering operation, without other parts of the casing being heated. This is made possible by the fact that the width of the roller is less than that of the tread.

In one embodiment, the tread is lifted.

This embodiment is suitable for treads that do not have a reinforcer.

In another embodiment, the carcass is pressed.

This embodiment is suitable for treads that are provided with reinforcers, although it can be used with treads that are not reinforced. In another embodiment, it is possible to both lift the tread and press the carcass. This embodiment is suitable for treads without a reinforcer. It reduces the tensions in the tread.

Also provided according to the disclosure is an installation for retreading a tire casing, which comprises:

at least one roller for rollering a casing, means for moving the roller in a direction parallel to an axis of the roller during the rollering operation, and means that are able to heat the casing during the rollering operation.

This installation makes it possible to implement the method of the disclosure.

Advantageously, the installation comprises at least two coaxial rollers and the means for moving are able to move the two rollers during the rollering operation.

Finally, a tire casing which results from a retreading method according to the disclosure is provided.

BRIEF DESCRIPTION OF THE DRAWINGS

Several embodiments of the method of the disclosure will now be presented with reference to the appended drawings, in which:

FIGS. 2 and 3 show a casing during retreading in accordance with another embodiment of the method of the disclosure;

FIGS. 4 and 5 are views of a casing during retreading in accordance with another embodiment of the method of the disclosure.

DETAILED DESCRIPTION

Figure 1:
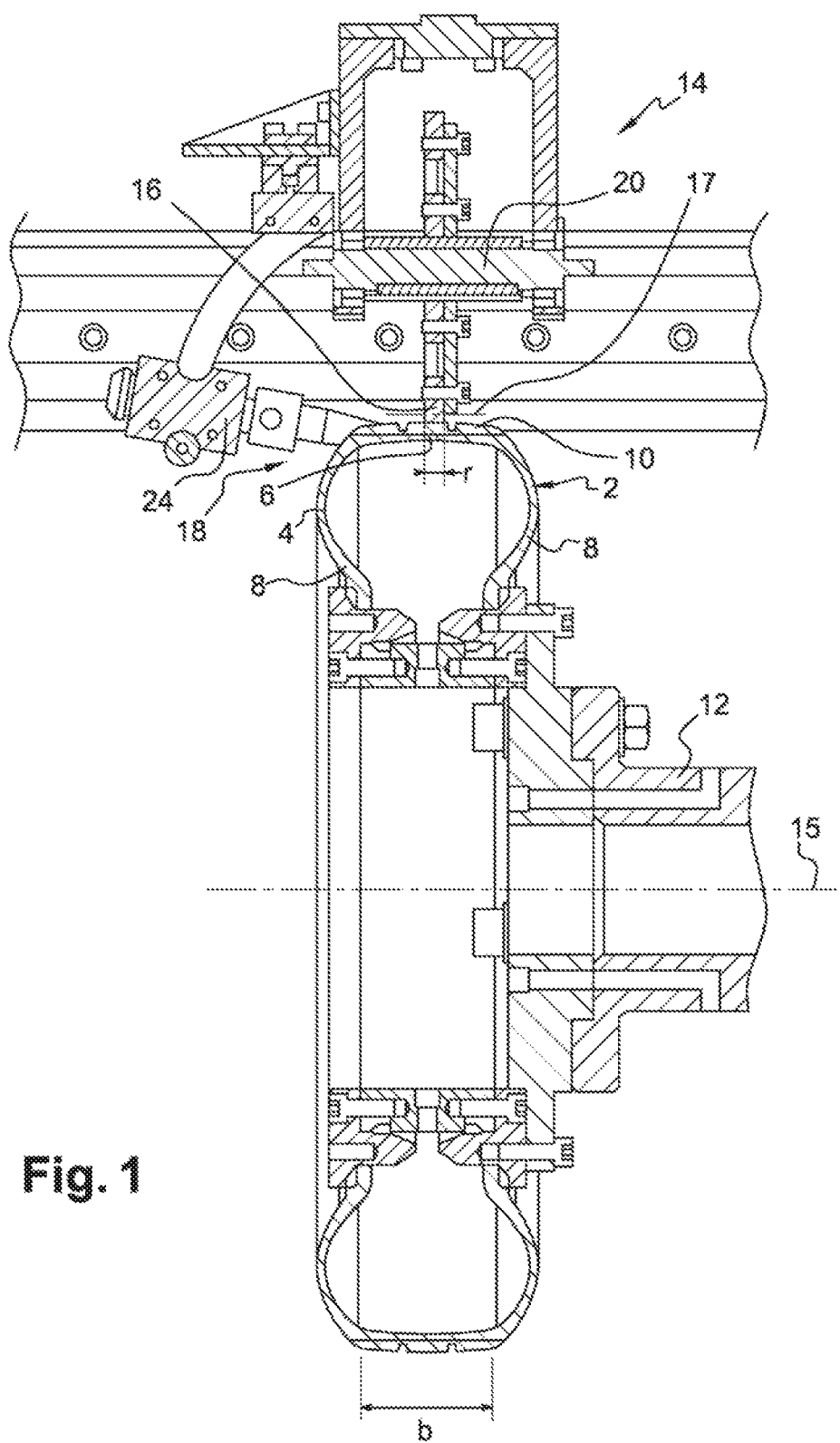
FIG. 1 is a view in axial section of a retreading installation implementing the method of the disclosure.

Several embodiments of the method of the disclosure, which serves for retreading vehicle wheel tire casings, will be presented.

It is assumed that a tire casing having a worn tread is provided.

This tread is removed from the carcass in order that the latter is ready to receive a new tread or at the very least a tread that is compatible with the use of the casing as a tire on a wheel.

To this end, provision can be made for the casing to originally comprise a hot-melt bonding layer interposed between the carcass and the tread. In order to eliminate the tread, it is thus possible to heat this hot-melt layer by means known per se to a predetermined temperature which is characteristic of the material and at which this material softens. It is then sufficient to pull on the tread in order to separate it from the carcass.

A hot-melt material is understood to be a material that is able to soften when it is heated in order to be brought to a predetermined temperature that is characteristic of the material, known as the softening temperature. For example, such a material can be chosen from thermoplastic elastomers such as SBS (styrene-butadiene-styrene) or SIS (styrene-isoprene-styrene). For the purposes of the disclosure, reference is made to a hot-melt material that is capable of softening at a temperature of between 140° C. and 200° C.

Thus, a carcass 4 of a casing 2 that does not have a tread is provided. This carcass comprises a crown layer 6 and two sidewalls 8.

A new tread 10 made of cured rubber and provided or not provided with reinforcers is furthermore provided. In addition, the tread is configured in the form of a closed ring before it is fitted on the carcass.

Hot-melt material is then applied to an external face of the crown layer 6 that is intended to receive the tread or to an internal face of the latter that is intended to come into contact with the carcass. In this case, this hot-melt material is applied to both of these faces.

Next, the tread 10 is fitted on the crown layer 6 by pressing together the two layers of hot-melt material which will form only a single bonding layer after the retreading operation.

Then, the casing is fitted on a rotating mount 12 of the installation 14 illustrated in FIG. 1. The installation comprises means for setting the mount 12 in rotation about a horizontal axis 15 which corresponds to the main axis of the casing 2.

The mount and the casing are set in rotation and at least one rollering roller 16 of the installation is applied to the external face of the tread 10. The installation 14 is equipped with support means 20 for the roller 16 which ensure that it is kept pressed against the tread during the rollering operation. In the direction of its rotation axis 17, which is parallel to the axis 15, this roller has a width r less than the total width b of the tread. In the present example, this width is less than half and even than one quarter of the width b. The roller exerts a radial pressure on the tread in the direction of the axis 15 in order to press it against the bonding layer and the crown layer 6.

The support means 20 are designed to guide the roller in a sliding manner in a direction parallel to the axis 15 during the rollering operation. Thus, the installation is controlled such that the roller executes several circuits of the casing on the tread and the roller is moved in this direction during the circuits. For example, the roller can be shifted from one circuit to another by a pitch which is equal to the width r of the roller. In this way, although this width is very much less than that of the tread, complete rollering of the latter is ensured. However, the pitch can be slightly smaller in order to ensure better rollering or slightly greater in order to reduce the number of circuits for retreading the casing.

During the rollering operation, the hot-melt material is heated locally. To this end, the installation is equipped with means 18 for heating a region of the tread before it is subjected to rollering by the roller. These means therefore extend upstream of the roller with respect to the direction of rotation of the tread. The heating may be convective heating by way of hot air, heating by way of a flame or heating by radiation, for example by means of a laser. More particularly according to the disclosure, heating is carried out for a very short period of time and locally at the surface of a thin layer of hot-melt material so as to be able to soften it before the rollering operation and such that the hot-melt material is no longer softened immediately after the passage of the roller. By way of example, when the layer of hot-melt material is a layer of SBS, the layer of SBS is heated locally and instantaneously to a temperature equal to or greater than 150° C. just before the rollering operation. The temperature of the hot-melt material drops to 90° C. immediately after the rollering operation. This makes it possible to keep the rapidly solidified hot-melt material in position and to prevent it from being moved by the pressure exerted by the roller. Preferably, a thin layer with a thickness less than 100 µm and more preferably less than 50 µm is deposited in order that it can be heated and softened instantaneously, while being able to solidify rapidly in the absence of heating.

Once rollering has been carried out, the casing is allowed to cool, this resulting in the solidification of the bonding layer made of hot-melt material and the solid adhesion of the tread to the carcass. The casing is then ready to be used.

Preferably, the tread comprises reinforcers made of metal, textile and/or synthetic material, that are oriented at 0° or are slightly inclined with respect to this direction in order to avoid elongations brought about by the pressure of the roller which compresses the tread. The synthetic material is for example nylon, PET (polyethylene terephthalate) or aramid.

The hot-melt material is formed for example by a thermoplastic elastomer.

Provision can be made for the heating to bring it to a temperature of around 200°. The installation can be designed such that the roller applies a local pressure of between 1 and 4 bar, i.e. between $1\times10^5$ and $4\times10^5$ Pa, preferably between 2 and $3\times10^5$ Pa. Since the hot-melt material has to cool rapidly after it has left the pressure region, the ratio between the rate of rotation of the casing and the diameter of the rollering roller will be suitably chosen.

In another embodiment illustrated in FIGS. 2 and 3, the installation is equipped not with a single roller 16 but with several. There are two of these rollers 16 here, which are coaxial. They roller the tread simultaneously.

At the start of the rollering operation, the two rollers take up for example contiguous positions at equal distances from the opposite edges 22 of the tread. After the central part of the latter has been rollered for one or more circuits, during the following circuits, the rollers are moved progressively towards the respective edges 22, for example on each occasion by a pitch equal to the width of each roller. This manner of operating, starting from the central region of the tread, makes it possible for no air bubbles to be trapped between the carcass and the tread.

Preferably, each of the two rollers is associated with its own heating member.

Figure 5:
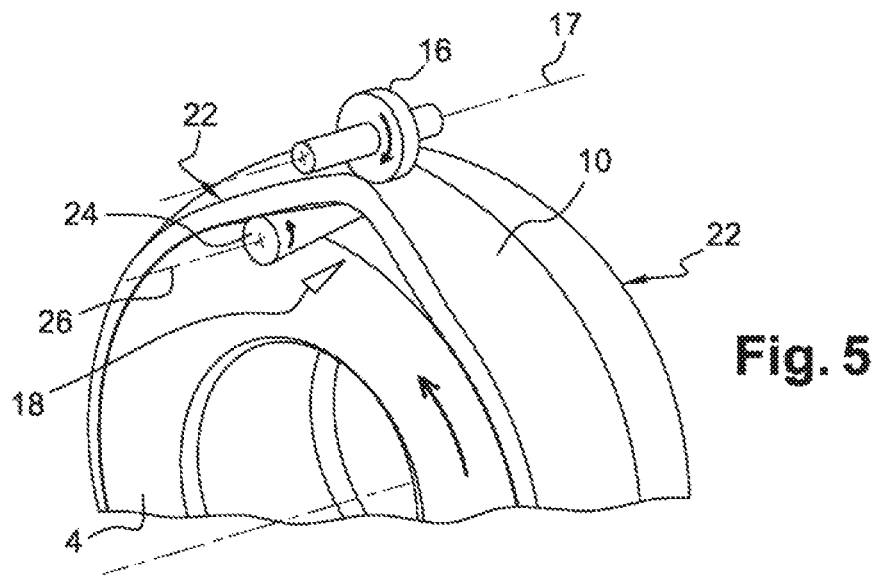

Another embodiment is illustrated in FIGS. 4 and 5. This time, the tread 10 is lifted locally in order to heat the hot-melt material extending between the latter and the carcass 4 before they are pressed together. The heating member 18 thus extends in line with the opening thus formed between these two elements, as illustrated in FIG. 4

More specifically, in this case, a first edge 22 of the tread is kept in contact with the carcass, and during this time the second edge 22 is lifted and the hot-melt material contiguous with the second edge is heated in the space thus created. Of course, these operations are carried out locally on a portion of the casing without affecting the rest of the casing. Downstream of the heating location, the tread is pressed against the carcass by the roller 16. In this way, by means of one or more circuits, the bonding layer is heated and the entire circumference of the tread is pressed against the carcass across half of its width. As before, these operations are carried out from the center to the shoulder contiguous with the edge 22 thus lifted. The tread is thus pressed progressively against the carcass from the center to the shoulder.

Next, the same procedure is carried out with the other half of the tread. For this purpose, the second edge 22 is kept in contact with the carcass, and the first edge is lifted locally. In the space thus created, the hot-melt material contiguous with the first edge is heated just before the rollering operation is carried out downstream of the heating region.

However, it is possible to carry out the operations on both halves of the tread simultaneously.

In order to lift the tread, use can be made for example of a tool such as a spike 24 having a frustoconical shape, the narrowest part of which is introduced between the carcass and the tread in order to lift the latter. The spike 24 is carried by the installation 14 for example by means of an arm, as illustrated in FIG. 1. The axis 26 of the spike is substantially parallel to the axis 17 of the roller or slightly inclined with respect to the latter. The tread is lifted without the carcass being squashed. In addition, the spike is set in rotation about the axis 26 in order that the contact between the spike and the tread produces rolling friction rather than sliding friction and there is thus no risk of the rubber being damaged. The spike therefore turns in the opposite direction to the roller.

The heating can take place for example with a jet of hot air projected through a conical nozzle 18.

This embodiment is notably suitable for treads that do not have longitudinal reinforcers.

Figure 6:
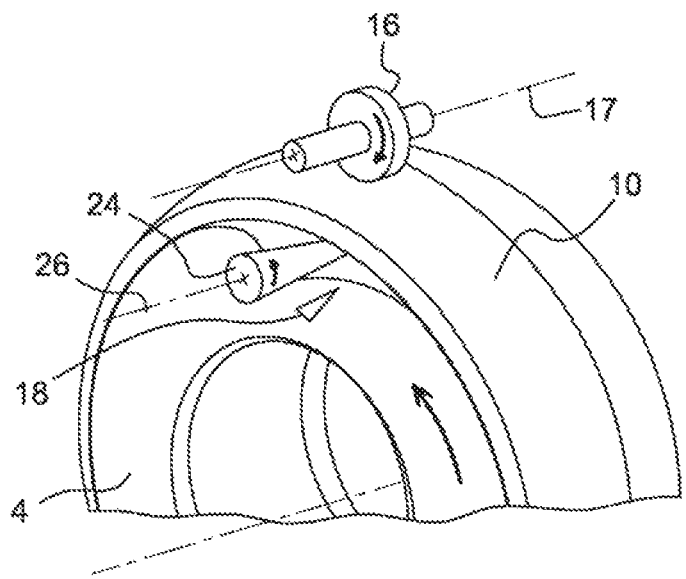
FIGS. 6 and 7 are views similar to FIG. 5, showing two other respective embodiments.
Figure 7:
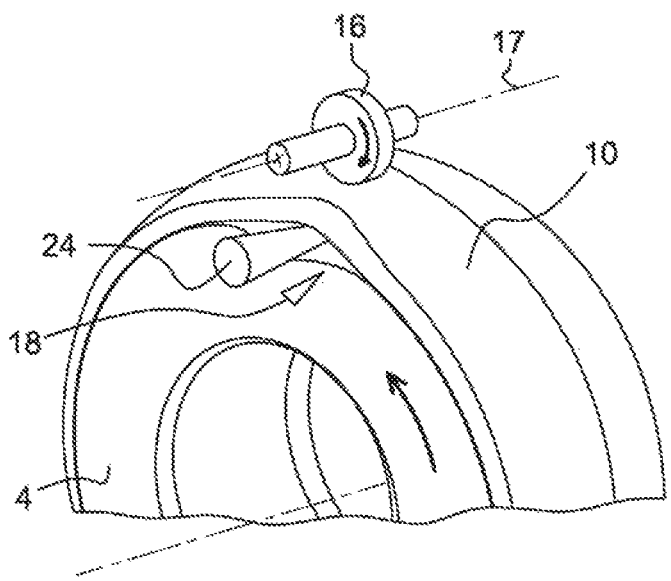

Two other embodiments are illustrated in FIGS. 6 and 7.

The embodiment in FIG. 6 differs from the preceding embodiment only in that this time the spike 24 squashes the carcass without lifting the tread. Thus, the carcass is pressed without the tread being pressed. The result is similar, namely that a space is created between one of the edges of the tread and the carcass, this making it possible to heat the hot-melt material by means of the nozzle 18. This time, the spike turns in the same direction as the roller.

The embodiment in FIG. 7 differs from those in FIGS. 5 and 6 only in that the spike 24 simultaneously lifts the tread and squashes the carcass in order to create the space for heating the hot-melt material. Unlike the two preceding embodiments, the spike is not set in rotation and the latter is forced between the tread and the carcass.

Of course, numerous modifications may be made to the disclosure without departing from the scope thereof.

The invention claimed is:

1. A method of retreading a tire casing, comprising the steps of;
    disposing a cured rubber tread in the form of a closed ring on a carcass with a layer of hot-melt material interposed between the tread and the carcass, and
    rollering the tread by means of at least one roller with a width that is less than a width of the tread, a part of the layer of hot-melt material being heated locally at points just before the rollering without other parts of the hot-melt material being heated.

2. The method as set forth in claim 1 wherein the tread comprises reinforcers.

3. The method as set forth in claim 1 wherein hot-melt material is disposed on the tread and the carcass and then the tread is fitted on the carcass.

4. The method as set forth in claim 1 wherein the width of the at least one roller is less than half the width of the tread.

5. The method as set forth in claim 1 wherein the at least one roller executes several circuits of the tire casing on the tread and the roller is moved in a direction of a casing axis between the circuits.

6. The method as set forth in claim 1 wherein the at least one roller exerts a pressure of between $1 \times 10^5$ and $4 \times 10^5$ Pa on the hot-melt layer.

7. The method as set forth in claim 1 wherein the number of rollers is greater than or equal to two and wherein the rollers roller the tread simultaneously during the rollering step, and the rollers are moved towards respective opposite edges of the tread simultaneously.

8. The method as set forth in claim 1 wherein a space is created by means of a frustoconical tool between an edge of the tread and the carcass by lifting the tread or by pressing the carcass and wherein the hot-melt material contiguous with this space is heated.

9. The method as set forth in claim 8 wherein the heating of the hot-melt material includes directing a heat nozzle into the space between the tread and carcass.

10. A method of retreading a tire casing, comprising the steps of;
    disposing a cured rubber tread in the form of a closed ring on a carcass with a layer of hot-melt material interposed between the tread and the carcass, and
    rollering the tread by means of at least one roller with a width that is less than a width of the tread, a part of the layer of hot-melt material being heated locally at points just before the rollering without other parts of the hot-melt material being heated, and
    wherein the heating step comprises creating a space between an edge of the tread and the carcass by means of a frustoconical tool located at said points just before the rollering, the space being created by lifting the tread or by pressing the carcass and wherein the heating of the hot-melt material includes projecting hot air into the space through a conical nozzle.

* * * * *